United States Patent
Xia et al.

(10) Patent No.: US 8,259,836 B2
(45) Date of Patent: Sep. 4, 2012

(54) METHOD AND SYSTEM FOR GENERATING CANDIDATE BEAMFORMING COEFFICIENTS FOR TRANSMISSION OF DATA OVER A WIRELESS MEDIUM

(75) Inventors: Pengfei Xia, Mountain View, CA (US); Su-Khiong Yong, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 601 days.

(21) Appl. No.: 12/368,912

(22) Filed: Feb. 10, 2009

(65) Prior Publication Data

US 2009/0141824 A1 Jun. 4, 2009

Related U.S. Application Data

(63) Continuation-in-part of application No. 11/864,656, filed on Sep. 28, 2007.

(60) Provisional application No. 61/029,247, filed on Feb. 15, 2008, provisional application No. 60/872,974, filed on Dec. 4, 2006, provisional application No. 60/872,949, filed on Dec. 4, 2006, provisional application No. 60/875,065, filed on Dec. 15, 2006, provisional application No. 60/903,961, filed on Feb. 28, 2007.

(51) Int. Cl.
   *H04B 7/02* (2006.01)
(52) U.S. Cl. .................. 375/267; 375/260; 455/101
(58) Field of Classification Search ............. 370/203, 370/208, 335, 344; 375/259, 260, 267, 299, 375/343, 347; 455/63.4, 67.11, 101, 562.1
   See application file for complete search history.

(56) References Cited

U.S. PATENT DOCUMENTS

| 4,660,202 A | 4/1987 | Woodsum |
| 6,747,795 B2 | 6/2004 | Lin et al. |
| 6,868,133 B2 | 3/2005 | Hicks et al. |

(Continued)

FOREIGN PATENT DOCUMENTS

EP    0537932 A2    4/1993

(Continued)

OTHER PUBLICATIONS

Notification of Transmittal of the International Search Report and the Written Opinion of the International Searching Authority mailed Aug. 19, 2009 in PCT International Application No. PCT/KR2009/000698, 10 pages.

(Continued)

*Primary Examiner* — Leon-Viet Nguyen
(74) *Attorney, Agent, or Firm* — Kenneth L. Sherman, Esq.; Michael Zarrabian, Esq.; Sherman & Zarrabian LLP (57) ABSTRACT

A method and system for generating a number of candidate beamforming vectors for transmission of data over a wireless medium, is provided. One implementation involves determining the number (N) of transmitter antennas; determining the number (n) of candidate beamforming vectors to be constructed as an algebraic function of N; providing a Fourier transform matrix W comprising (n+1) rows and (n+1) columns; selecting N rows from the Fourier transform matrix W; and generating an abridged matrix using the selected N rows, wherein each column of the abridged matrix is configured to be used as a candidate beamforming vector for transmission of a data signal, such that the abridged matrix comprises a N×n sub-matrix of the Fourier transform matrix W.

23 Claims, 7 Drawing Sheets

U.S. PATENT DOCUMENTS

| | | | |
|---|---|---|---|
| 6,888,809 B1 | 5/2005 | Foschini et al. | |
| 7,058,005 B2 | 6/2006 | Ehrmann-Patin et al. | |
| 7,209,556 B2 | 4/2007 | Ohkuma et al. | |
| 7,236,535 B2 | 6/2007 | Subramaniam et al. | |
| 7,292,877 B2 | 11/2007 | Yoon et al. | |
| 7,336,727 B2 | 2/2008 | Mukkavilli et al. | |
| 7,342,904 B2 | 3/2008 | Sun et al. | |
| 7,415,085 B2 | 8/2008 | Fujii et al. | |
| 7,508,334 B2 | 3/2009 | Allen et al. | |
| 7,511,762 B2 | 3/2009 | Elnathan et al. | |
| 7,551,682 B2 * | 6/2009 | Na et al. | 375/267 |
| 7,570,210 B1 | 8/2009 | Nabar et al. | |
| 7,583,982 B2 | 9/2009 | Olesen et al. | |
| 7,634,015 B2 | 12/2009 | Waxman | |
| 7,684,761 B2 | 3/2010 | Hottinen | |
| 7,702,029 B2 | 4/2010 | Kotecha et al. | |
| 7,714,781 B2 | 5/2010 | Xia et al. | |
| 7,714,783 B2 | 5/2010 | Niu et al. | |
| 7,729,439 B2 | 6/2010 | Zhang et al. | |
| 7,751,495 B1 | 7/2010 | Palanivelu et al. | |
| 7,778,607 B2 | 8/2010 | Withers, Jr. et al. | |
| 7,804,800 B2 | 9/2010 | Li et al. | |
| 7,813,458 B2 | 10/2010 | Waes et al. | |
| 7,869,546 B2 | 1/2011 | Tsai | |
| 7,995,670 B2 | 8/2011 | Kim et al. | |
| 2004/0047424 A1 | 3/2004 | Ramaswamy et al. | 375/240.27 |
| 2004/0131011 A1 | 7/2004 | Sandell et al. | |
| 2004/0146117 A1* | 7/2004 | Subramaniam et al. | 375/260 |
| 2005/0195734 A1 | 9/2005 | Sandell et al. | |
| 2005/0286663 A1 | 12/2005 | Poon | |
| 2006/0146692 A1 | 7/2006 | Gorokhov et al. | |
| 2007/0014272 A1* | 1/2007 | Palanki et al. | 370/344 |
| 2007/0098063 A1* | 5/2007 | Reznic et al. | 375/240.2 |
| 2007/0115797 A1 | 5/2007 | Reznic et al. | |
| 2007/0171304 A1 | 7/2007 | Reznic et al. | |
| 2007/0177670 A1 | 8/2007 | Elnathan et al. | |
| 2007/0189397 A1 | 8/2007 | Ngo et al. | |
| 2007/0198887 A1 | 8/2007 | Reznic et al. | |
| 2007/0217546 A1 | 9/2007 | Sandell et al. | |
| 2007/0280116 A1 | 12/2007 | Wang et al. | |
| 2007/0286063 A1 | 12/2007 | Aulin | |
| 2008/0063034 A1 | 3/2008 | Yang et al. | |
| 2008/0076370 A1 | 3/2008 | Kotecha et al. | |
| 2008/0080449 A1 | 4/2008 | Huang et al. | |
| 2008/0095259 A1 | 4/2008 | Dyer et al. | |
| 2008/0130764 A1 | 6/2008 | Xia et al. | |
| 2008/0130778 A1 | 6/2008 | Xia et al. | |
| 2008/0134254 A1 | 6/2008 | Xia et al. | |
| 2008/0144751 A1 | 6/2008 | Xia et al. | |
| 2008/0204319 A1 | 8/2008 | Niu et al. | 342/377 |
| 2008/0317150 A1 | 12/2008 | Alexander et al. | |
| 2009/0046765 A1 | 2/2009 | Xia et al. | |
| 2009/0046798 A1 | 2/2009 | Xia et al. | |
| 2009/0132851 A1 | 5/2009 | Pruthi | |
| 2009/0207765 A1 | 8/2009 | Yamaura | |
| 2009/0233556 A1 | 9/2009 | Xia et al. | |

FOREIGN PATENT DOCUMENTS

| | | |
|---|---|---|
| KR | 2001-76252 A | 11/2001 |
| KR | 2003-0083207 A | 10/2003 |
| KR | 2007-89748 A | 8/2007 |
| WO | 01/43309 A2 | 6/2001 |
| WO | WO 02/35853 A2 | 5/2002 |
| WO | WO 2006/007571 A1 | 1/2006 |

OTHER PUBLICATIONS

U.S. Non-Final Office Action for U.S. Appl. No. 11/864,656 mailed Nov. 26, 2010.

U.S. Final Office Action for U.S. Appl. No. 11/864,656 mailed Apr. 6, 2011.

U.S. Advisory Action for U.S. Appl. No. 11/864,656 mailed Apr. 28, 2011.

U.S. Non-Final Office Action for U.S. Appl. No. 11/864,721 mailed Sep. 2, 2010.

U.S. Non-Final Office Action for U.S. Appl. No. 11/864,753 mailed Sep. 2, 2010.

U.S. Non-Final Office Action for U.S. Appl. No. 11/864,707 mailed on Oct. 29, 2010.

U.S. Non-Final Office Action for U.S. Appl. No. 11/864,707 mailed on Mar. 2, 2011.

U.S. Non-Final Office Action for U.S. Appl. No. 12/144,535 mailed Mar. 31, 2011.

Caetano, L., "SiBEAM—60 GHz Architecture for Wireless Video Display," SiBEAM, Inc., White Paper, Mar. 2006, pp. 1-6, United States.

FreshNews.com, "SiBEAM Receives Equity Investment from Best Buy," downloaded Feb. 2, 2010 from http://freshnews.com/print/node/261440, pp. 1-2, Jan. 4, 2010, United States.

Hachman, M., "CE Giants back Amimon's Wireless HDTV Tech," PCMAG.com, Jul. 23, 2008, p. 1, United States.

LG Electronics, Inc., "WirelessHD Specification Version 1.0 Overview," Oct. 9, 2007, pp. 1-77, United States.

"NEC Develops Compact Millimeter-Wave Transceiver for Uncompressed HDTV Signal Transmission," NE Asia Online, Apr. 4, 2005, (downloaded from http://neasia.nikkeibp.com/topstory/000913 on Sep. 29, 2006), pp. 1-2, United States.

U.S. Non-final Office Action for U.S. Appl. No. 11/864,656 mailed Aug. 6, 2010 United States.

International Search Report for PCT/KR2007/003172 dated on Nov. 19, 2007.

Babak Hassibi and Bertrand M. Hochwald, "How Much Training is Needed in Multiple-Antenna Wireless Link?", IEEE Transactions on Information Theory, vol. 49, No. 4, Apr. 2003, pp. 951-963.

Pengfei Xia et al., "Adaptive MIMO-OFDM Based on Partial Channel State Information," IEEE Transactions on signal processing, vol. 52, No. 1, Jan. 2004, pp. 202-213.

Pengfei Xia et al., "Achieving the Welch Bound with Difference Sets," IEEE Transactions on Information Theory, vol. 51, No. 5, May 2005, pp. 1900-1907.

G. David Forney, Jr, "Burst-Correcting codes for the Classic Bursty Channel," IEEE Transactions on Communications Technology, vol. Com-19, No. 56, Oct. 1971, pp. 772-781.

"Digital Video Broadcasting (DVB); Framing structure, channel coding and modulation for digital terrestrial television," ETSI EN 300 744, v1.4.1. (Jan. 2001), pp. 1-49.

Van Veen, B.; and Buckley, K., "Beamforming: A Versatile Approach to Spatial Filtering," IEEE ASSP Magazine, vol. 5, pp. 4-24, Apr. 1988.

U.S. Non-Final Office Action for U.S. Appl. No. 11/864,656 mailed Apr. 6, 2012.

* cited by examiner

METHOD AND SYSTEM FOR GENERATING CANDIDATE BEAMFORMING COEFFICIENTS FOR TRANSMISSION OF DATA OVER A WIRELESS MEDIUM

RELATED APPLICATIONS

This application claims priority from U.S. Provisional Patent Application Ser. No. 61/029,247 filed on Feb. 15, 2008, incorporated herein by reference. This application further claims priority under 35 U.S.C. §120 of U.S. patent application Ser. No. 11/864,656 filed on Sep. 28, 2007, which in turn claims priority from U.S. Provisional Patent Application Nos. 60/872,974 and 60/872,949 filed on Dec. 4, 2006, 60/875,065 filed on Dec. 15, 2006, and 60/903,961 filed on Feb. 28, 2007, which are hereby incorporated by reference in their entirety.

FIELD OF THE INVENTION

The present invention relates to wireless communication, and in particular, to beamforming wireless communication.

BACKGROUND OF THE INVENTION

In wireless communication systems including transmitters and receivers, antenna array beamforming provides increased signal quality (high directional antenna beamforming gain) and an extended communication range by steering the transmitted signal in a desired direction. To enable high throughput wireless links between a wireless transmitter and a wireless receiver over wireless channels, essentially optimal transmit and receive analog beamforming vectors (beamforming coefficients) should be acquired in advance.

In a multiple-input-multiple-output (MIMO) wireless communications system including a wireless transmitter and a wireless receiver, availability of accurate communication channel state information at the transmitter allows higher performance (e.g., throughput, operating range). Transmit beamforming uses the channel information for determining beamforming coefficients (beamforming/steering vectors) to properly steer the transmission beams for achieving higher performance. To calculate the beamforming vector for a specific receiver, the transmitter requires an accurate estimate of the communication channel. A beamforming transmitter sends a training sequence to the receiver wherein the receiver estimate channel information (e.g., response of a MIMO channel) based on the training symbols. The receiver provides feedback information about the channel to the transmitter. The feedback information includes channel matrices/vectors or beamforming coefficient matrices to be used by the transmitter for beam steering.

To eliminate channel estimation overhead, a codebook may be used to determine such coefficients, wherein the codebook includes predetermined set of possible coefficients. Specifically, the codebook includes a group of coefficient matrices (vectors) from which one matrix is selected to be a beamforming matrix used to perform beamforming. A codebook construction/design may be based on a Fourier matrix. Conventionally, choice of the row indices from the Fourier matrix in forming the codebook have been based generally on a numerical search in order to maximize a certain performance metric for a codebook size based on the number of transmit antennas and feedback bits from the receiver. Codebook construction/design may also involve in providing an optimal codebook for very limited choice of the number of transmit antennas and feedback bits from the receiver.

BRIEF SUMMARY OF THE INVENTION

The present invention provides a method and system for generating a number of candidate beamforming vectors for transmission of data over a wireless medium. One embodiment involves determining the number (N) of transmitter antennas; determining the number (n) of candidate beamforming vectors to be constructed as an algebraic function of N; providing a Fourier transform matrix W comprising (n+1) rows and (n+1) columns; selecting N rows from the Fourier transform matrix W; and generating an abridged matrix using the selected N rows, wherein each column of the abridged matrix is configured to be used as a candidate beamforming vector for transmission of a data signal, such that the abridged matrix comprises a N×n sub-matrix of the Fourier transform matrix W.

These and other features, aspects and advantages of the present invention will become understood with reference to the following description, appended claims and accompanying figures.

DETAILED DESCRIPTION OF THE INVENTION

The present invention provides a method and system for wireless communications involving a codebook (beambook) design for feedback transmit beamforming coefficients in wireless communication systems. The codebook is useful for beamforming systems in wireless communications. The invention provides a limited feedback codebook using Fourier approach which allows efficient and reduced complexity of beamforming operations. The transmitter and receiver in a communication system use the same codebook design which can be easily generated and requires minimum memory storage requirement.

The present invention is applicable to high throughput wireless communications, such as ECMA 387 standards for High Rate 60 GHz PHY, MAC and HDMI PAL, and implementation of WirelessHD standard on uncompressed video transmission. An example implementation for a 60 GHz frequency band wireless network is described below, useful with ECMA and WirelessHD (WiHD) applications. Ecma International (Ecma) develops standards for Information and Communication Technology (ICT) and Consumer Electronics (CE). WirelessHD is an industry-led effort to define a wireless digital network interface specification for wireless HD digital signal transmission on the 60 GHz frequency band, e.g., for consumer electronics (CE) and other electronic products. An example of WiHD network utilizes a 60 GHz-band mm-Wave technology to support a physical (PHY) layer data transmission rate of multi-Gbps (gigabits per second), and can be used for transmitting uncompressed high definition television (HDTV) signals wirelessly. The present invention is useful with other wireless communication systems such as IEEE 802.11.

Certain examples provide a method and system for transmission of uncompressed HD video information from a sender to a receiver over wireless channels, however the present invention is useful with, and applicable to, wireless communication of non-video data as well.

System Overview

Figure 1:
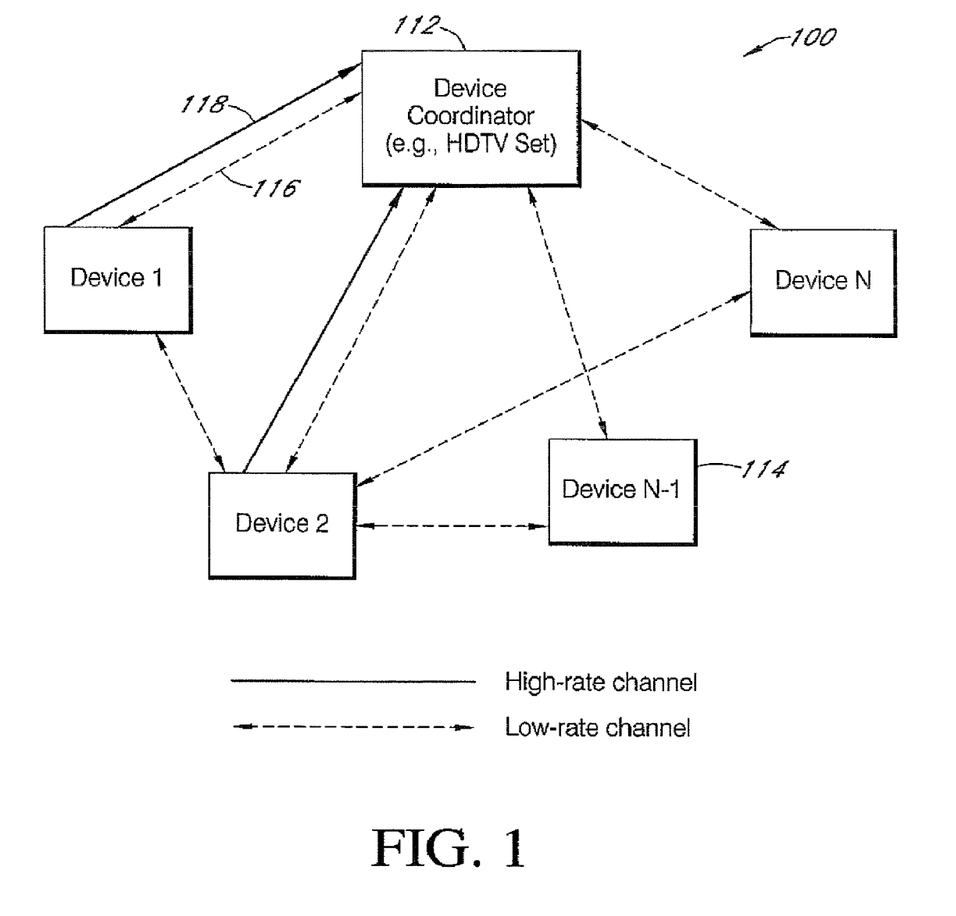
FIG. 1 is a functional block diagram of a wireless network that implements beamforming transmission between wireless devices according to one embodiment of the invention.

Example embodiments of the invention in a wireless high definition (HD) audio/video (A/V) system will now be described, however the present invention is useful with, and applicable to, wireless communication of non-video data as well. For example, FIG. 1 shows a functional block diagram of a wireless network 100 that implements uncompressed HD video transmission between A/V devices such as an A/V device coordinator and A/V stations, according to certain embodiments. Although the example below is for A/V information, the present invention is useful for wireless communication of all forms of data and is not limited to A/V information. In other embodiments, one or more of the devices can be a computer, such as a personal computer (PC) for communication of various types of data, not limited to A/V data. The network 100 includes a device coordinator 112 and multiple A/V stations 114 (e.g., Device 1, . . . , Device N). The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. For transmission of non-video data, there may be no need for an LR channel and an HR channel.

Each station 114 uses the low-rate channel 116 for communications with other stations 114. The high-rate channel 118 supports single direction unicast transmission over directional beams established by beamforming, with e.g., multi-GHz bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel (Frequency Division Duplex (FDD) may also be used). At any one time, the low-rate and high-rate channels cannot be used in parallel for transmission, in certain embodiments. Beamforming technology can be used in both low-rate and high-rate channels. The low-rate channels can also support omni-directional transmissions. For transmission of non-video data, there may be no need for an LR channel and an HR channel, and the same channel may be used for transmission of various types of data.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. In another embodiment, the receiver 112 may be a projector. The sender 114 can be a source of uncompressed video or audio. Examples of the sender 114 include a set-top box, a DVD player or recorder, digital camera, camcorder, other computing device (e.g., laptop, desktop, PDA, etc.), and so forth.

Figure 2:
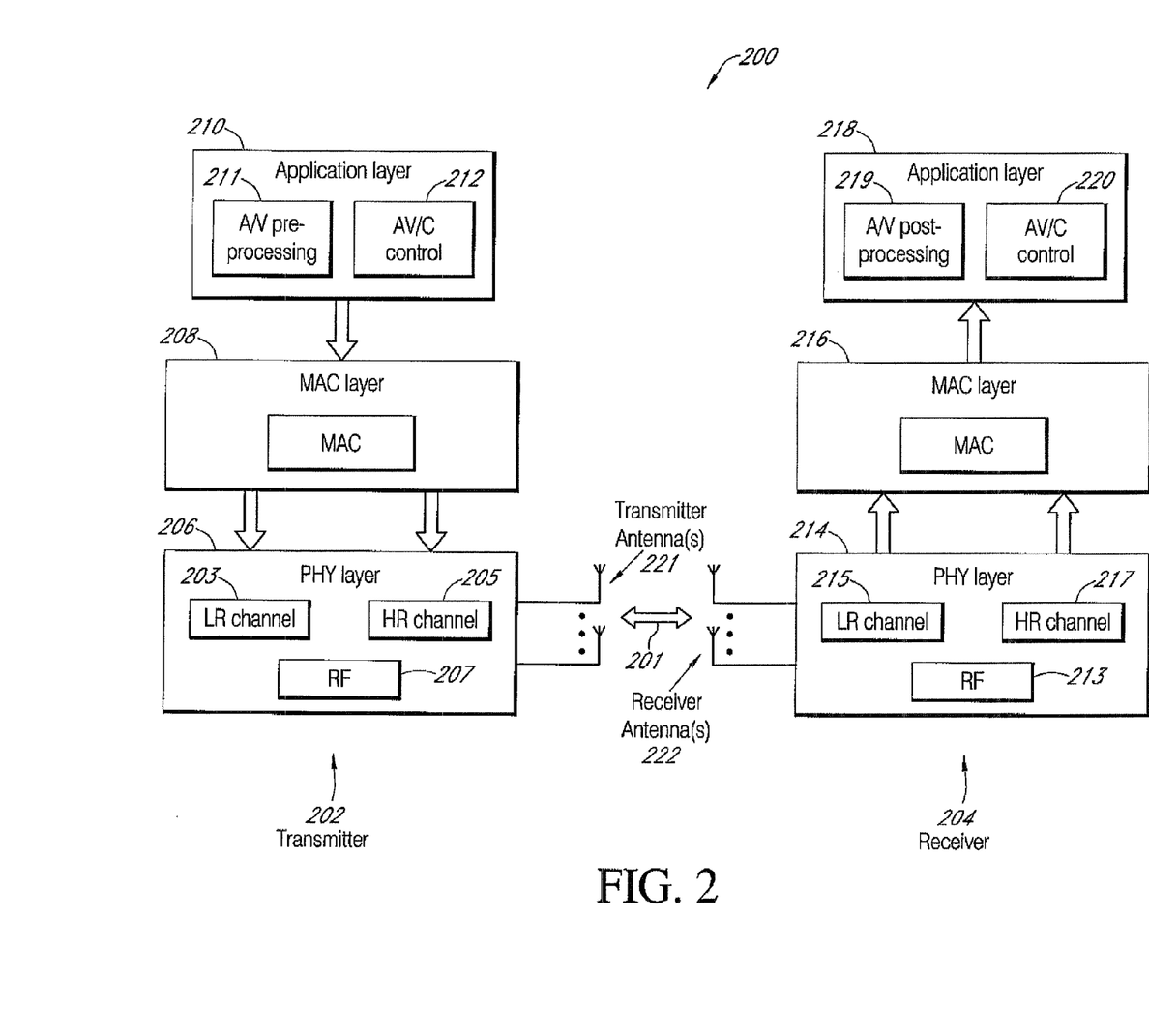
FIG. 2 is a functional block diagram of an example communication system for beamforming transmission over a wireless medium, according to one embodiment of the invention.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Beamforming

Transmit and/or receive beamforming has the potential of improving link quality substantially in wireless communications. Such beamforming is useful for transmission of different types of data. For typical multiple-input/multiple-output (MIMO) systems, transmit and/or receiver beamforming are implemented in the digital domain, before a digital to analog conversion (DAC) operation at a transmitter side and after an analog-to-digital conversion (ADC) operation at a receiver side. The good performance of digitally beamformed systems comes at a cost of N+M RF chains, where N is the number of transmitter antennas and M is the number of receiver antennas. The cost may become formidable, especially when the sampling frequency increases. When cost-effectiveness becomes a dominant system design issue, analog beamforming is more favorable, as it requires only one RF chain.

In the following, analog beamforming for MIMO OFDM (orthogonal frequency division multiplex) systems is described, while the same scheme can be applied to MIMO single carrier modulated systems as well. Such analog beamforming is useful for wireless communication of various types of data including video and non-video data. Analog beamforming reduces implementation costs, particularly important when the number of antennas are large as in 60 GHz wireless communication. Suppose that K is the number of sub-carriers for OFDM modulation, N is the number of transmitter antennas, and M is the number of receiver antennas. Also, assume that the transmit beamforming vector is $\vec{w}=[w_1, w_2, \ldots, w_N]^T$ and the receive beamforming vector is $\vec{v}=[v_1, v_2, \ldots, v_M]^T$. Also, let L+1 be the maximum number of multipath channel taps for each pair of transmit and receive antennas. Without loss of generality, it is reasonable to have K>>L+1 (i.e., the number of OFDM sub-carriers is much greater than the maximum number of multipath channel taps between any pair of transmitter and receiver antennas). Further, let $\vec{h}_{ij}=[h_{ij}(0)\ h_{ij}(1)\ h_{ij}(2)\ \ldots\ h_{ij}(L)\ 0\ \ldots\ 0]^T$ be the multipath channel impulse response between the ith receive and jth transmit antenna, appended with zeros such that each vector $\vec{h}_{ij}$ is of size K×1. There are altogether M×N such channel vectors, with each one corresponding to one transmit and receive antenna pair. Let $S=\text{diag}(s_1, s_2, \ldots, s_K)$ be a diagonal matrix containing all the K data sub-carriers in an OFDM system. Thus, the transmitted vector (over an OFDM symbol duration) on a jth transmitter antenna after beamforming is $[w_j s_1, w_j s_2, \ldots, w_j s_K]$, for j=1, 2, ..., N. Because OFDM modulation diagonalizes the multipath channel, the received vector (over an OFDM symbol duration) on the ith receive antenna can be written as $$\vec{y}_i = \sum_{j=1}^{N} w_j S \vec{c}_{ij},$$

where $\vec{c}_{ij}=F_K \vec{h}_{ij}$ is the frequency channel response corresponding to the time-domain channel $\vec{h}_{ij}$, $w_j$ is the jth transmit beamforming coefficient, and $F_K$ is a K×K Fourier transform matrix.

At the receiver side, the received vectors $\vec{y}_i$ across all M receiver antennas will be combined by receive beamforming vectors $\vec{v}=[v_1, v_2, \ldots, v_M]^T$, where $v_i$ is the ith receive beamforming coefficient. For this reason, the combined signal vector can be written as $$\vec{z} = \sum_{i=1}^{M} v_i \vec{y}_i = \sum_{i=1}^{M} v_i \sum_{j=1}^{N} w_j S \vec{c}_{ij} = S \sum_{i=1}^{M} v_i \sum_{j=1}^{N} w_j \vec{c}_{ij}$$

$$\vec{z} = S \sum_{i=1}^{M} v_i A_i \vec{w}$$

$$\vec{z} = SA\vec{v}$$

where the K×N matrix $A_i$ is defined as $A_i=[\vec{c}_{i1}, \vec{c}_{i2}, \ldots, \vec{c}_{iN}]$, and the K×N matrix A is defined as $$A = \sum_{i=1}^{M} v_i A_i.$$

Similarly, the received signal vector can be written as $$\vec{z} = S \sum_{j=1}^{N} w_j \sum_{i=1}^{M} v_i \vec{c}_{ij}$$

$$\vec{z} = S \sum_{j=1}^{N} w_j B_j \vec{v}$$

$$\vec{z} = SB\vec{w}$$

where the K×M matrix $B_j$ is defined as $B_j=[\vec{c}_{1j}, \vec{c}_{2j}, \ldots, \vec{c}_{Mj}]$, and the K×M matrix B is defined as $$B = \sum_{j=1}^{N} w_j B_j.$$

To optimize the transmit and receive beamforming vectors, one embodiment of the invention finds the transmit and receive beamforming vectors that jointly minimize the pairwise error probability (PEP) between two arbitrary information codes. Toward this objective, one embodiment of the invention solves the following two problems simultaneously:

maximize $\vec{v}^H B^H B \vec{v}$ subject to $\|\vec{v}\|=1$ and maximize $\vec{w}^H A^H A \vec{w}$ subject to $\|\vec{w}\|=1$.

It is noted that the matrix A is dependent upon vector $\vec{w}$, while the matrix B is dependent upon vector $\vec{v}$. For this reason, the above two problems cannot be solved easily. To find the optimal beamforming vectors iteratively, a beamforming search algorithm has been proposed in U.S. patent application Ser. No. 11/881,978, filed on Jul. 30, 2007, entitled "Method and System for Analog Beamforming in Wireless Communication Systems," which is herein incorporated by reference.

Figure 3:
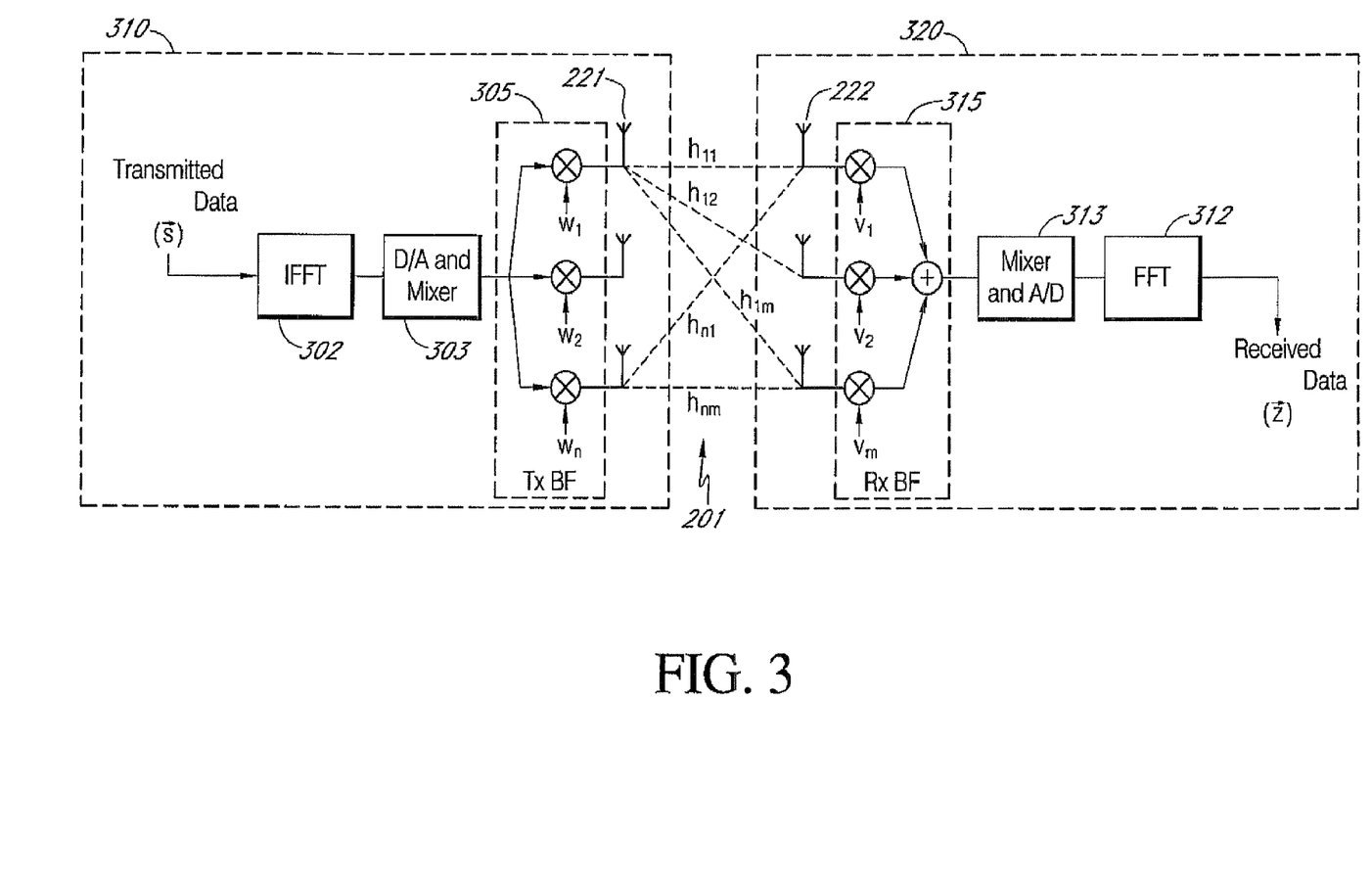
FIG. 3 is a diagram demonstrating an exemplary beamforming scheme of a communication system according to one embodiment of the invention.

FIG. 3 is a diagram demonstrating an exemplary beamforming scheme of a wireless communication system, as applied to an MIMO OFDM system, according to an embodiment of the invention. The system in FIG. 3 is useful for wireless communication of various types of data including video and non-video data. The disclosed invention can also be applied for non-OFDM modulated schemes, such as single carrier modulated systems. In one embodiment, the system 300 is for the implementation of analog beamforming. The system 300 includes a transmitter 310 and a receiver 320. The transmitter 310 includes a module 302 for performing an inverse Fourier transform, a module 303 for performing digital-to-analog conversion and mixing, a transmitter beamformer 305, and transmitter antennas 221. The receiver 320 includes a module 312 for performing a Fourier transform, a module 313 for performing analog-to-digital conversion and mixing, a receiver beamformer 315, and receiver antennas 222. The transmitter 310 and receiver 320 perform beamforming in conjunction with each other.

On the transmitter side, data, denoted by the vector $\vec{s}$, is input into the system 300. After an inverse Fourier transform (IFFT) 302, as well as digital-to-analog conversion and mixing 303, the modified data is input into the transmitter beamformer 305. The weights of the transmitter beamformer 305 are denoted by the variables $\vec{w}_i$, for i=1, 2, ..., N, where N is the number of the transmitter antennas 221. After being weighted by the transmitter beamformer 305, the data is transmitted by the transmitter antennas 221 through the wireless channel 201, where it is received by the receiver antennas 222. The receiver beamformer 315 acts upon the received data to demodulate it. The weights of the receiver beamformer 315 are denoted by the variables $v_i$ for i=1, 2, ..., M, where M is the number of the receiver antennas 222. After being processed by the receiver beamformer 315, the receiver data is input through the mixer and analog-to-digital converter 313. Also, a Fourier transform 312 is performed on the data to yield the final received data 311, denoted by the vector $\vec{z}$.

Figure 4A:
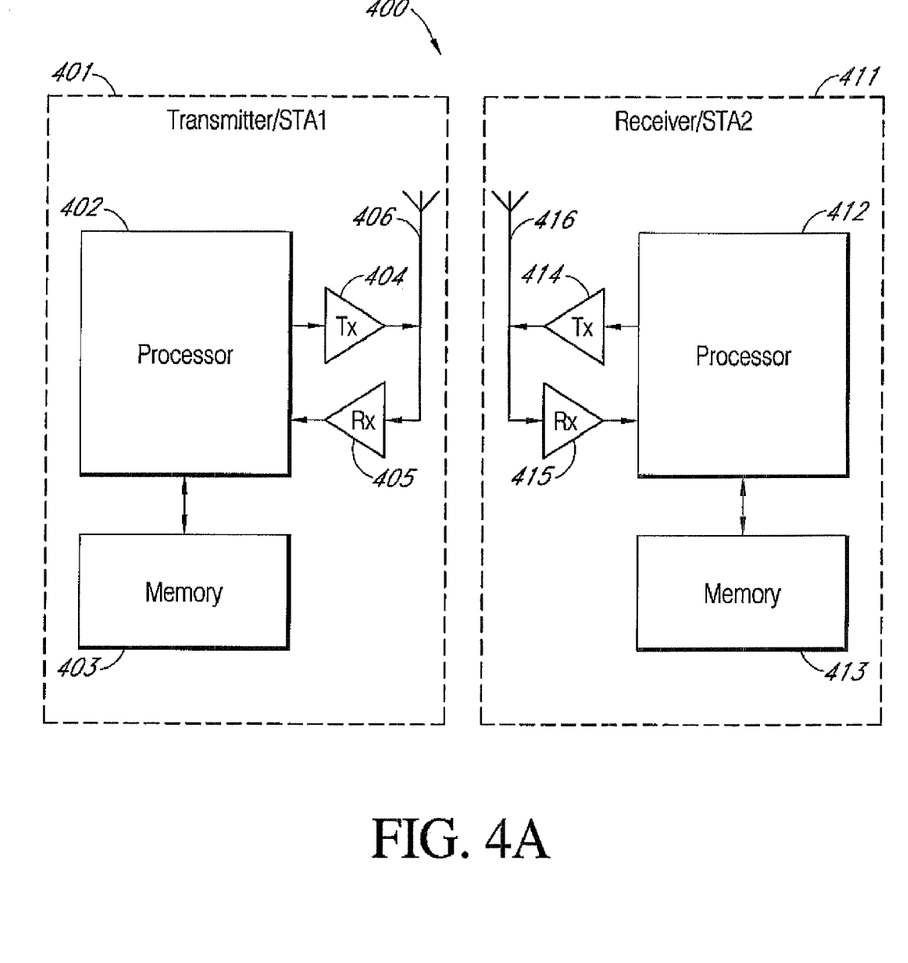
FIG. 4A is a block diagram illustrating the transmitter and receiver of a beamforming wireless communication system according to one embodiment of the invention.

FIG. 4A is an exemplary block diagram illustrating the transmitter and receiver of a wireless communication system according to one embodiment of the invention. A system 400 includes two stations, denoted STA1 401 and STA2 411. Each station includes a processor 402, 412 as well as a memory for storage 403, 413. Each of the stations also includes a transceiver structure that further includes a transmitter 404, 414 and a receiver 405, 415 which connect to an antenna or set of antennas 406, 416. The system 400 can perform procedures 500, 600 described further below, for creating and using an abridged DFT matrix so as to generate a set of candidate beamforming vectors.

In one embodiment, the procedure 500 is implemented in a conventional programming language, such as C or C++ or another suitable programming language. In one embodiment of the invention, the program is stored on a computer accessible storage medium of the transmitter 401 and/or the receiver 411, for example, such as the memory 403 and/or 413. In another embodiment, the program can be stored in other system locations so long as it can perform the procedure 500 according to embodiments of the invention. The storage medium may include any of a variety of technologies for storing information. In one embodiment, the storage medium includes a random access memory (RAM), hard disks, floppy disks, digital video devices, compact discs, video discs, and/or other optical storage mediums, etc.

In another embodiment, the processor 402 and/or 412 can be configured to or programmed to perform the procedure 500. The program may be stored in the processor 402 and/or 412 or the memory 403 and/or 413. In various embodiments, the processor 402, 412 may have a configuration based on Intel Corporation's family of microprocessors, such as the Pentium family and Microsoft Corporation's Windows operating systems such as Windows 95/98/2000/XP or Windows NT. In one embodiment, the processor is implemented with a variety of computer platforms using a single chip or multichip microprocessors, digital signal processors, embedded microprocessors, microcontrollers, etc. In another embodiment, the processor is enabled by a wide range of operating systems such as Unix, Linux, Microsoft DOS, Microsoft Windows 2000/9x/ME/XP, Macintosh OS, OS/2 and the like. In another embodiment, the procedure 500 can be implemented with embedded software or firmware.

Figure 4B:
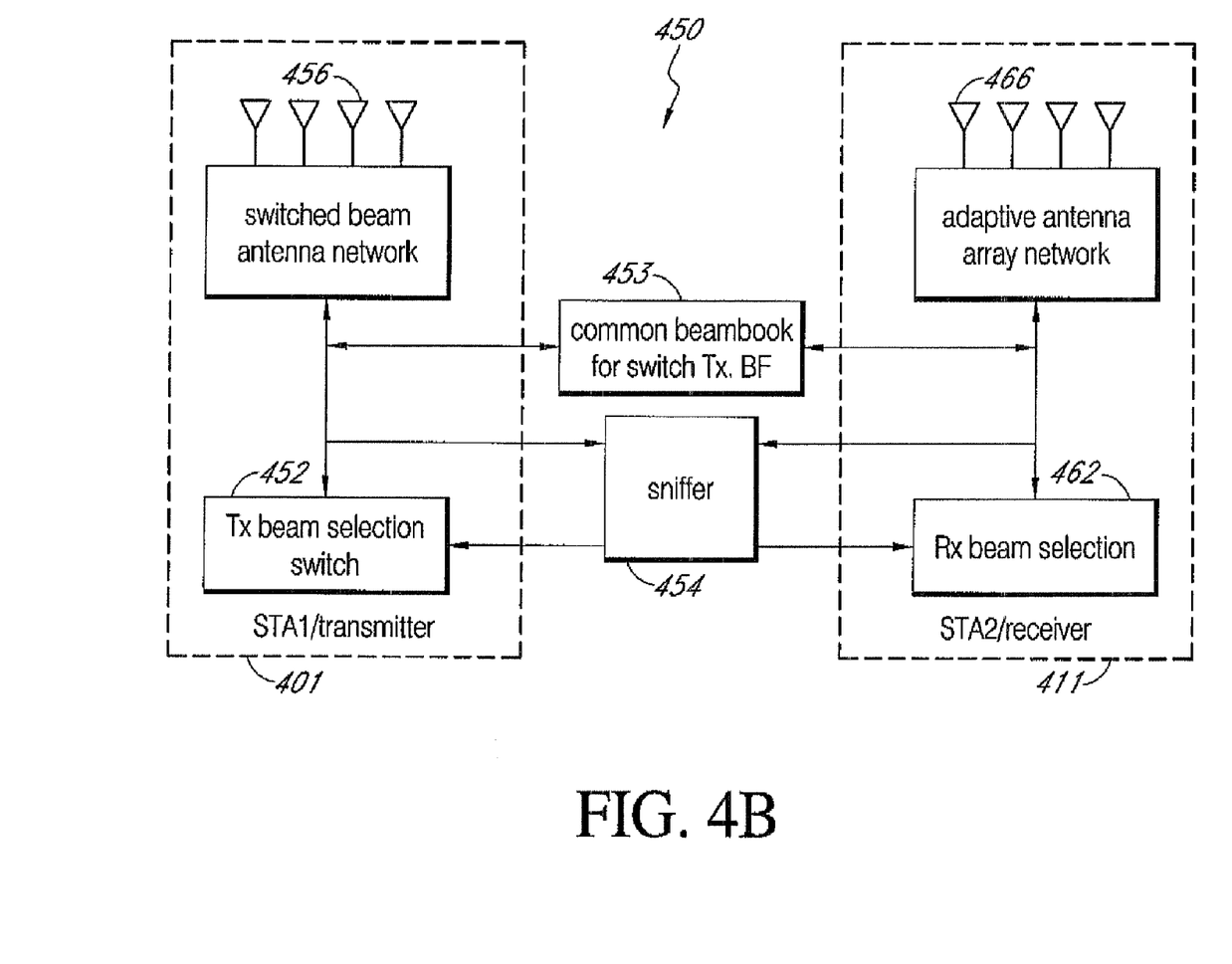
FIG. 4B is a block diagram illustrating the transmitter and receiver of a beamforming wireless communication system, according to another embodiment of the invention.

FIG. 4B is an exemplary block diagram illustrating the transmitter and receiver of a wireless communication system, according to another embodiment of the invention. In a system 450, the processor of STA1 401 includes a transmitter beam selection switch 452, and the memory of the transmitter 401 includes a common beambook 453. In one embodiment, the transmitter antenna is a switched beam antenna (SBA) network 456 or adaptive antenna array (AAA) network. In one embodiment, the processor of STA2 411 performs receiver beam selection 462 and the memory of the receiver 411 includes the same common beambook 453. The receiver antenna of STA2 411 in this embodiment includes an adaptive antenna array network 466 or may be a SBA network. Both stations 401, 411 are connected to a sniffer 454 which acts to determine the wireless channel parameters. The system 450 can perform at least one of the procedures 500 and 600 (described further below).

Creating a Codebook by Abridging a DFT Matrix

Because it takes much processing to maintain an adaptive antennas array network at both the transmitter and the receiver, it may be advantageous to restrict the transmitter beamformer 305 (see FIG. 3) to a common codebook (or beambook) 453 (see FIG. 4B), i.e., a pool/group of candidate beamforming vectors, from which the transmitter beamformer 305 will choose the final beamforming vector. In one embodiment, each candidate beamforming vector is an N-dimension vector, where N is the number of transmitter antennas 221 (see FIG. 3), while the pool contains Q candidate beamforming vectors in total, with Q also known as the codebook size and is a design parameter to be fixed.

According to one embodiment of the invention, per transmission packet, the transmitter sends out a preamble sequence to measure the channel and then the receiver makes a decision on which candidate beam is the best for the current packet and sends back the index of the best candidate beamforming vector to the transmitter. In this embodiment, the transmitter then looks it up in the common codebook 453 and uses the best candidate beam to carry out data/video communications. In this embodiment, a feedback of only $\log_2 Q$ bits is needed. In one embodiment, a collection of candidate beamforming vectors (the codebook 453) are constructed in advance and stored at both the transmitter and receiver sides.

One embodiment of the present invention, described below, provides a process for designing a codebook. In the following description, N is the number of transmit antennas and n is the number of feedback bits from the receiver (i.e., n represents said number (Q) of candidate beamforming vectors (or codewords) to be constructed). The codebook design (construction) is based on a Fourier matrix. Selection of the row indices from the Fourier matrix in forming the codebook is based on an algebraic approach, which may be near optimal. This applies to codebook construction where n+1 is power of 2 and N is at most half the value of n (wherein n is an integer, and n+1 is a power of 2) Such codebook construction may be used for many values of N while N is less than or equal to (n+1)/2.

A preferred transmit beamforming vector, when estimated at the receiver and fed back to the transmitter, uses vector quantization based on Fourier codebooks. The transmit beamforming vector is estimated at the receiver side. In order to feedback the knowledge of the transmit beamforming vector to the transmitter, a vector quantization approach is used. For example, let W be a N×1 transmit beamforming vector to be quantized and CB be the Fourier codebook (described further below), while CB=$[c_1\ c_2\ \ldots\ c_n]$ is a N×n matrix with each column $c_i$ being a N×1 vector serving as one candidate. Altogether there are n candidates contained in the codebook CB. The transmit beamforming vector w may be quantized to $c_i$ if and only if:

$$|c_i^H w| \geq |c_j^H w|, \forall j \neq i, \quad (1)$$

where $(\cdot)^H$ is the conjugate transpose operation. Then, the index of $c_i$ in the codebook CB, which is the positive integer i, is fed back to the transmitter from the receiver via a reverse communication link. All the possible indices range from 1 to n. A binary representation of the positive integer i is utilized as $\lceil \log_2 n \rceil$ bits in total, where $\lceil \cdot \rceil$ is the ceiling function returning to the largest integer that is larger than its argument. Upon receiving the index i, the transmitter uses the corresponding codeword $c_i$ in the codebook CB to approximate the actual transmit beamforming vector w.

Construction of Fourier Codebook CB

According to an embodiment of the invention, the Fourier codebook is constructed based on a Fourier transformation matrix. In the codebook matrix each column is a codeword, which is a candidate beamforming vector. In operation, the receiver estimates the channel and uses certain criteria to select a codeword from the codebook by determining index of the codeword. Then, the receiver feeds back the index of the codeword in the codebook to the transmitter. The transmitter uses the index to lookup that codeword in its codebook, and uses the codeword to perform beamforming communication with the receiver.

Figure 5:
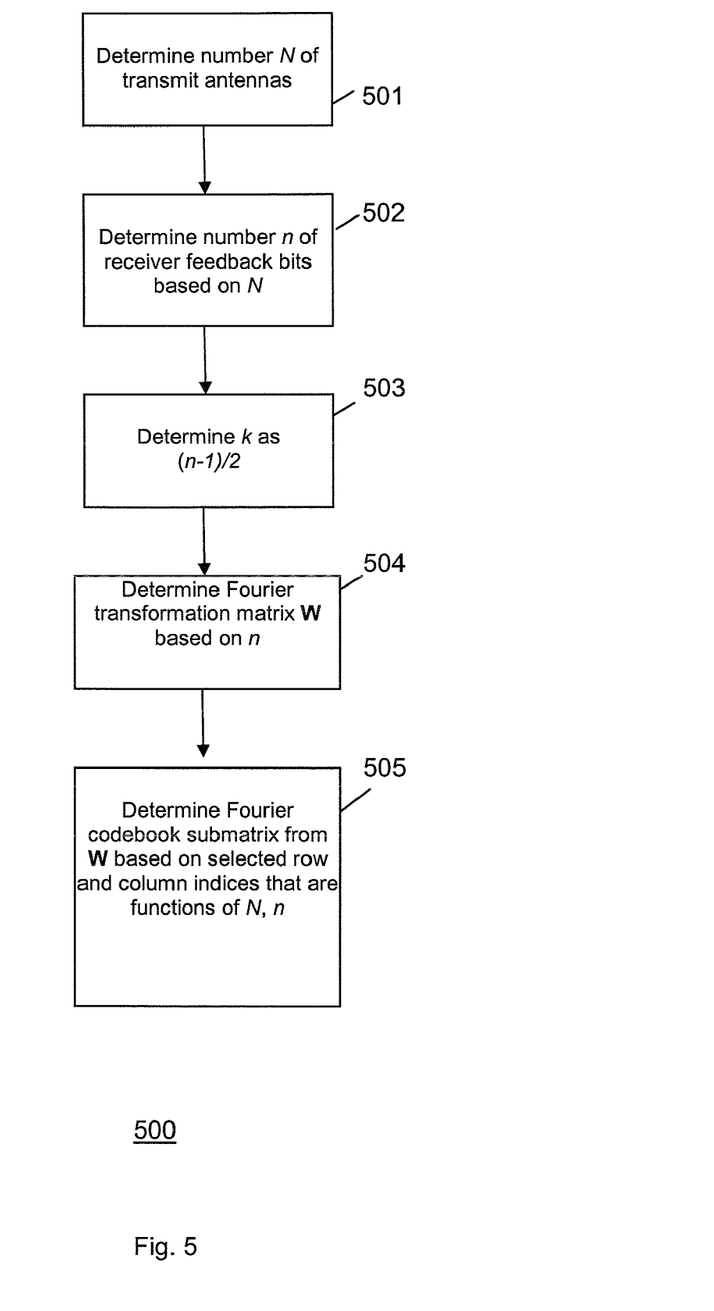
FIG. 5 is a flowchart of a process for constructing a Fourier codebook for beamforming communication in a wireless communication system, according to one embodiment of the invention.

FIG. 5 shows a process (procedure) 500 for codebook construction. In block 501 the number N of transmit antennas are determined. Then, in block 502 the value n as the number of feedback bits from the receiver is determined as an algebraic function of N as $n = 2^{\lfloor \log_2 N \rfloor + 2} - 1$, where $\lfloor \cdot \rfloor$ is the floor operation that returns the largest integer that is no larger than the argument. Next in block 503, an interim value k is determined as $k = (n-1)/2$, wherein $N \leq k$.

Next in block 504, the Fourier transformation matrix W (e.g., discrete Fourier transform (DFT) matrix) is determined based on n. Specifically, in determining the matrix W, the $(s,t)^{th}$ element of matrix W is specified as $$[W]_{(s,t)} = \frac{1}{\sqrt{n+1}} q^{(s-1)(t-1)}$$

with $$q = e^{-j\frac{2\pi}{n+1}}.$$

Next in block 505, N rows are selected out of the Fourier transformation matrix W to generate the Fourier codebook matrix CB. The Fourier codebook CB is an abridged version of the Fourier transformation matrix W. Specifically, the Fourier codebook CB is selected as a N×n submatrix of the $(n+1) \times (n+1)$ Fourier transformation matrix W, according to an embodiment of the invention.

The selected column indices in matrix W are $\{1, 2, \ldots, n\}$ and the selected row indices in matrix W are $\{r_1, r_2, \ldots, r_N\}$ where $r = \{r_1, r_2, \ldots, r_N\}$ is a set of integers, $$r = \{t : 0 \leq t < n, \text{trace}(\alpha^t) = 0\} \quad (2)$$

with the trace function being defined as:

$$\text{trace}(\alpha) = \sum_{i=0}^{\lfloor \log_2 N \rfloor + 1} \alpha^{2^i}$$

where α is a generator of the multiplicative group $F(2^{\lfloor \log_2 N \rfloor + 2})$.

Using the algebraic functions above according to an embodiment of the invention, the codebook design does not require any numerical search in determining the row indices to be chosen. Instead an algebraic selection of rows is performed. Such an algebraic selection reduces complexity. The codebook design is applicable to many different values of N as long as N is less than (n+1)/2.

In one implementation, the process 500 may be implemented in the wireless systems shown in FIGS. 4A-B, without limitation to video transmission. A codebook generated according to process 500 may then used as the beambook 453 in the system of FIG. 4B for wireless data communication.

Figure 6:
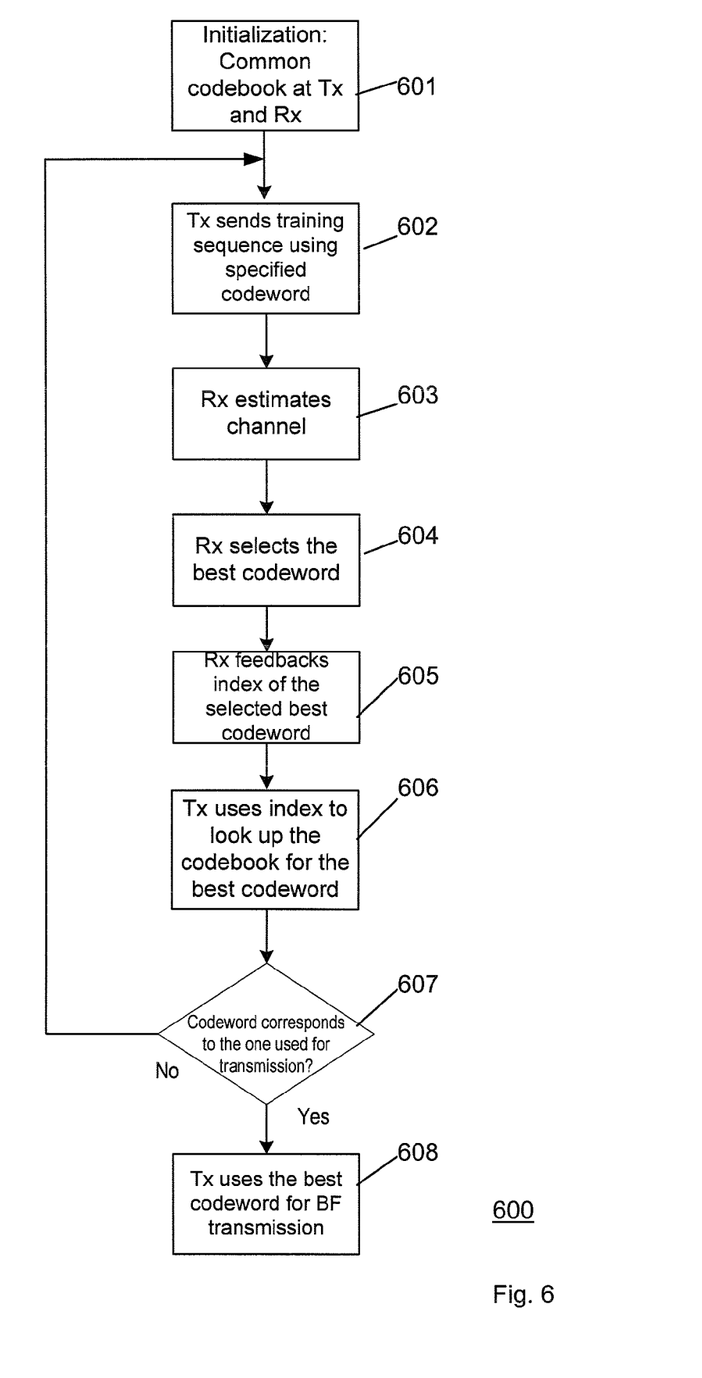
FIG. 6 is a flowchart of a process for beamforming wireless communication using a codebook in a wireless communication system, according to one embodiment of the invention.

FIG. 6 shows a flowchart of a process (procedure) 600 for using a codebook in wireless communication between a transmitter (Tx) and a receiver (Rx) for wireless data communication using beamforming, wherein in one example implementation Rx is omni-directional transmission capable. The process 600 includes:

Block 601: Initially a codebook is designed (as described) and maintained at each of both the transmitter and the receiver.

Block 602: Transmitter sends out training sequence using a specified codeword (or beamforming vector) from its respective codebook.

Block 603: The receiver uses the received training sequence to estimate the communication channel.

Block 604: The receiver finds the best codeword from its codebook that yields best performance under the estimated channel.

Block 605: The receiver feeds back the index of the selected best codeword to the transmitter.

Block 606: The transmitter uses the feedback index to look up its respective codebook for the best codeword.

Block 607: The selected codeword corresponds to the codeword used in the transmission? If yes, proceed to block 608, else proceed to block 602.

Block 608: Transmitter uses the best codeword of the codebook to perform wireless beamforming transmission of data to the receiver. End.

In one implementation, the process 600 may be implemented in the wireless systems shown in FIGS. 4A and 4B, without limitation to video transmission. The codebook generated in block 601 of FIG. 6 is according to the process 500 in FIG. 5. The codebook is then used as the beambook 453 in FIG. 4B for data communication according to process 600. Although the examples for FIGS. 1-4A-B are for A/V information, the present invention is useful with wireless communication of all forms of data and is not limited to A/V information.

The present invention further provides a system for generating a number of candidate beamforming vectors for transmission of data over a wireless medium. The system comprises a memory configured to store a plurality of candidate beamforming vectors, and a processor for executing software configured for generating the codebook as described above. The present invention further provides a wireless transmitter and a wireless receiver, configured for beamforming communication over a wireless medium (e.g., radio frequency or RF). The transmitter and the receiver each include a codebook in a memory therein, each codebook including a number of candidate beamforming vectors for transmission of data over a wireless medium.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof, however, other versions are possible. Therefore, the spirit and scope of the appended claims should not be limited to the description of the preferred versions contained herein.

What is claimed is:

1. A method of generating a number of candidate beamforming vectors for transmission of data over a wireless medium in a wireless communication system, the method comprising:
determining the number (N) of transmitter antennas;
determining the number (n) of candidate beamforming vectors to be constructed as an algebraic function of N;
providing a Fourier transform matrix W comprising (n+1) rows and (n+1) columns;
selecting N rows from the Fourier transform matrix W; and
generating an abridged matrix for a codebook using the selected N rows, wherein each column of the abridged matrix is configured to be used as a candidate beamforming vector for transmission of a data signal, such that the abridged matrix comprises a N×n sub-matrix of the Fourier transform matrix W,
wherein determining the number (n) of candidate beamforming vectors to be constructed further includes determining n as $n=2^{[log_2 N]+2}$, where [ ] is the floor operation that returns the largest integer that is no larger than the argument.

2. The method of claim 1, wherein providing a Fourier transform matrix W comprising (n+1) rows and (n+1) columns includes determining the matrix W, wherein the $(s, t)^{th}$ element of matrix W is specified as $[W]_{(s,\ t)} = 1/\sqrt{(n+1)} * q^{(s-1)(t-1)}$ with $q=e^{-j*2\pi/n+1}$.

3. The method of claim 1, wherein in selecting N rows from the Fourier transform matrix W, selected column indices in matrix W are $\{1,2,\ldots,n\}$ and the selected row indices in matrix W are $\{r_1, r_2, \ldots, r_N\}$ where $r=\{r_1, r_2, \ldots, r_k\}$ is a set of integers such that:

$r=\{t: 0 \leq t < n, \text{trace}(\alpha^t)=0\}$, $k=(n-1)/2$, wherein $N \leq k$, with the trace function being defined as:

$$\text{trace}(\alpha) = \sum_{i=0}^{\lfloor \log_2 N \rfloor +1} \alpha^{2^i}$$

where α is a generator of a multiplicative group $F(2^{\lfloor \log_2 N \rfloor +2})$.

4. The method of claim 1, wherein the Fourier transform matrix comprises a discrete Fourier transform (DFT) matrix.

5. The method of claim 1, wherein transmission of a data signal comprises transmission of high definition video information.

6. The method of claim 1, wherein the wireless communication system includes a wireless transmitter and a wireless receiver, the method further comprising:
the wireless transmitter and receiver cooperatively arriving at a final beamforming codebook including a predetermined set of said beamforming vectors comprising codewords for beamforming transmission of data over the wireless medium, by:
(a) maintaining an initial codebook at each of the transmitter and receiver;
(b) the transmitter transmitting a training sequence over a wireless communication channel using a specific codeword from the respective codebook;
(c) the receiver using the received training sequence to estimate the communication channel, the receiver further selecting the best codeword from its respective codebook which yields best performance under the estimated channel, and feeding back index of the selected best codeword to the transmitter;
(d) the transmitter using the index to look up its respective codebook for the best codeword;
(e) if the selected best codeword corresponds to the codeword used for transmission, indicative of convergence, then the transmitter using the best codeword to perform wireless beamforming transmission of data to the receiver, otherwise the transmitter and receiver cooperatively repeating steps (a)-(d).

7. The method of claim 1, wherein the algebraic function comprises a floor operation.

8. The method of claim 1, wherein the selecting of N rows is performed without numerical searching.

9. The method of claim 1, wherein N is less than (n+1)/2.

10. A system for generating a number of candidate beamforming vectors for transmission of data over a wireless medium, the system comprising:
a memory configured to store a plurality of candidate beamforming vectors; and
a processor for executing software configured for:
determining the number (n) of candidate beamforming vectors to be constructed as an algebraic function of a number of transmitter antennas N, wherein the algebraic function comprises a floor operation;
providing a Fourier transform matrix W comprising (n+1) rows and (n+1) columns;
selecting N rows from the Fourier transform matrix W; and
generating an abridged matrix using the selected N rows, wherein each column of the abridged matrix is configured to be used as a candidate beamforming vector for transmission of a data signal, such that the abridged matrix comprises a N×n sub-matrix of the Fourier transform matrix W.

11. The system of claim 10, wherein the memory is contained within a wireless beamforming transceiver.

12. The system of claim 10, wherein determining the number (n) of candidate beamforming vectors to be constructed further includes determining n as $n=2^{\lfloor \log_2 N \rfloor +2}-1$, where $\lfloor \;\rfloor$ is the floor operation that returns the largest integer that is no larger than the argument.

13. The system of claim 12, wherein providing a Fourier transform matrix W comprising (n+1)rows and (n+1) columns includes determining the matrix W, wherein the (s,t)$^{th}$ element of matrix W is specified as $$[W]_{(s,t)} = \frac{1}{\sqrt{n+1}} q^{(s-1)(t-1)}$$

with $$q = e^{-j\frac{2\pi}{n+1}}.$$

14. The system of claim 13, wherein in selecting N rows from the Fourier transform matrix W, selected column indices in matrix W are {1,2, ..., n} and the selected row indices in matrix W are $\{r_1, r_2, \ldots, r_N\}$ where $r=\{r_1, r_2, \ldots, r_k\}$ is a set of integers such that:

$r=\{t:0 \leq t<n, \text{trace}(\alpha^t)=0\}$, $k=(n-1)/2$, wherein $N \leq k$, with the trace function being defined as:

$$\text{trace}(\alpha) = \sum_{i=0}^{\lfloor \log_2 N \rfloor +1} \alpha^{2^i}$$

where α is a generator of a multiplicative group $F(2^{\lfloor \log_2 N \rfloor +2})$.

15. The system of claim 10, wherein the Fourier transform matrix comprises a discrete Fourier transform (DFT) matrix.

16. The system of claim 10, wherein transmission of a data signal comprises transmission of high definition video information.

17. A wireless communication system, comprising:
a wireless transmitter and a wireless receiver, configured for beamforming communication over a wireless medium;
the transmitter and the receiver each including a codebook in a memory therein, each codebook including a number of candidate beamforming vectors for transmission of data over a wireless medium;
wherein each codebook is generated by:
determining the number (N) of transmitter antennas;
determining the number (n) of candidate beamforming vectors to be constructed as an algebraic function of N, wherein the algebraic function comprises a floor operation;
providing a Fourier transform matrix W comprising (n+1) rows and (n+1) columns;
selecting N rows from the Fourier transform matrix W; and
generating an abridged matrix using the selected N rows, wherein each column of the abridged matrix is configured to be used as a candidate beamforming vector for transmission of a data signal, such that the abridged matrix comprises a N×n sub-matrix of the Fourier transform matrix W.

18. The system of claim 17, wherein determining the number (n) of candidate beamforming vectors to be constructed further includes determining n as n=$2^{\lfloor log_2 N \rfloor +2}$−1, where $\lfloor\ \rfloor$ is the floor operation that returns the largest integer that is no larger than the argument.

19. The system of claim 18, wherein providing a Fourier transform matrix W comprising (n+1) rows and (n+1) columns includes determining the matrix W, wherein the (s,t)$^{th}$ element of matrix W is specified as $$[W]_{(s,t)} = \frac{1}{\sqrt{n+1}} q^{(s-1)(t-1)}$$

with $$q = e^{-j\frac{2\pi}{n+1}}.$$

20. The system of claim 19, wherein in selecting N rows from the Fourier transform matrix W, selected column indices in matrix W are {1,2, . . . , n} and the selected row indices in matrix W are {$r_1, r_2, \ldots, r_N$} where r={$r_1, r_2, \ldots, r_k$} is a set of integers such that:

$$r=\{t: 0 \leq t < n, \text{trace}(\alpha^t)=0\},$$

k=(n−1)/2, wherein N≤k, with the trace function being defined as:

$$\text{trace}(\alpha) = \sum_{i=0}^{\lfloor log_2 N \rfloor +1} \alpha^{2^i}$$

where α is a generator of a multiplicative group F($2^{\lfloor log_2 N \rfloor +2}$).

21. The system of claim 17, wherein the Fourier transform matrix comprises a discrete Fourier transform (DFT) matrix.

22. The system of claim 17, wherein transmission of a data signal comprises transmission of high definition video information.

23. A wireless communication system, comprising:
a wireless receiver, configured for receiving beamforming communication over a wireless medium;
the receiver each including a codebook in a memory therein, the codebook including a number of candidate beamforming vectors for transmission of data over a wireless medium;
wherein each codebook is generated by:
determining the number (N) of transmitter antennas;
determining the number (n) of candidate beamforming vectors to be constructed as an algebraic function of N, wherein the algebraic function comprises a floor operation;
providing a Fourier transform matrix W comprising (n+1) rows and (n+1) columns;
selecting N rows from the Fourier transform matrix W; and
generating an abridged matrix using the selected N rows, wherein each column of the abridged matrix is configured to be used as a candidate beamforming vector for transmission of a data signal, such that the abridged matrix comprises a N×n sub-matrix of the Fourier transform matrix W.

* * * * *